W. G. RANSOM.
BRAKE EQUALIZER.
APPLICATION FILED JUNE 12, 1909.
935,926.
Patented Oct. 5, 1909.
3 SHEETS—SHEET 1.
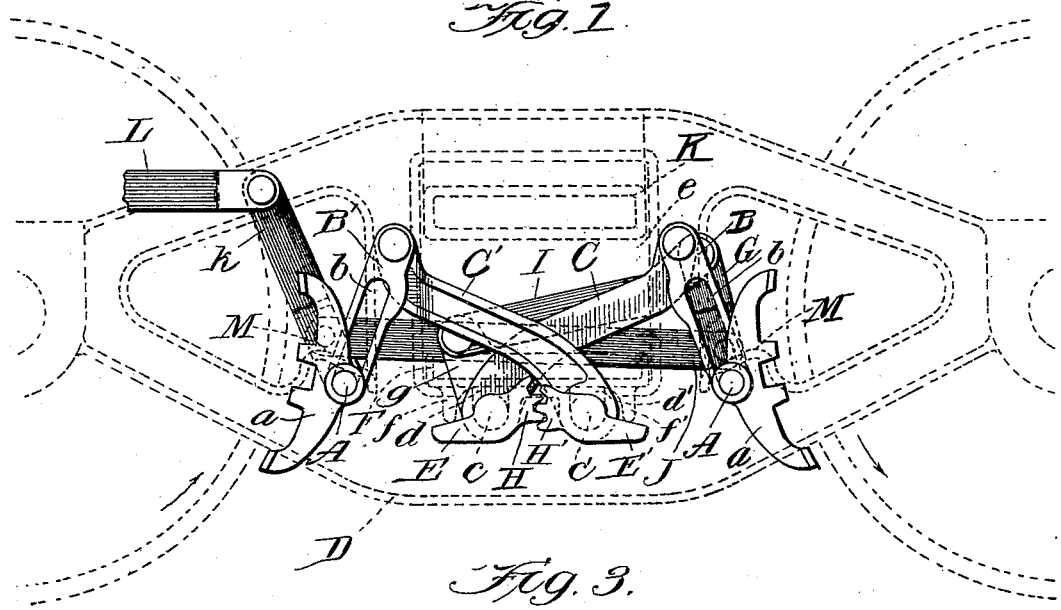
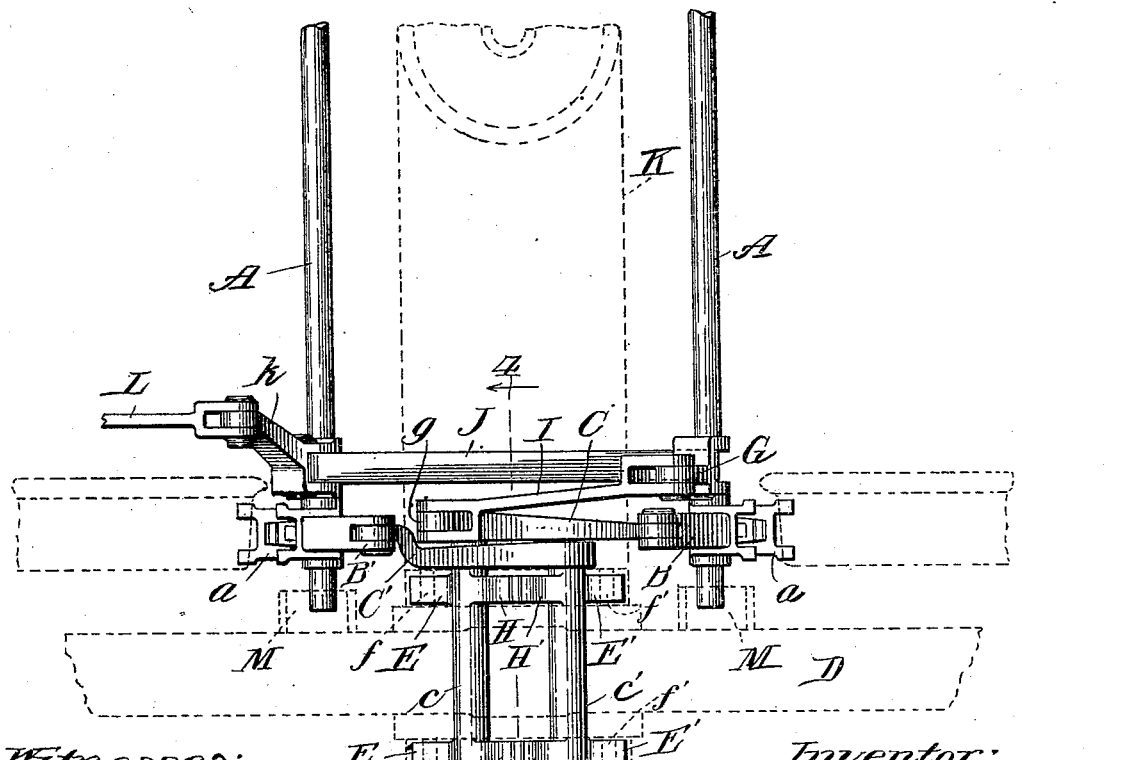
Witnesses:
E. K. Lundy.
Harry S. Gaither.
Inventor:
Willard G. Ransom
by Frank D. Thomason
atty W. G. RANSOM.
BRAKE EQUALIZER.
APPLICATION FILED JUNE 12, 1909.
935,926.
Patented Oct. 5, 1909.
3 SHEETS—SHEET 2.
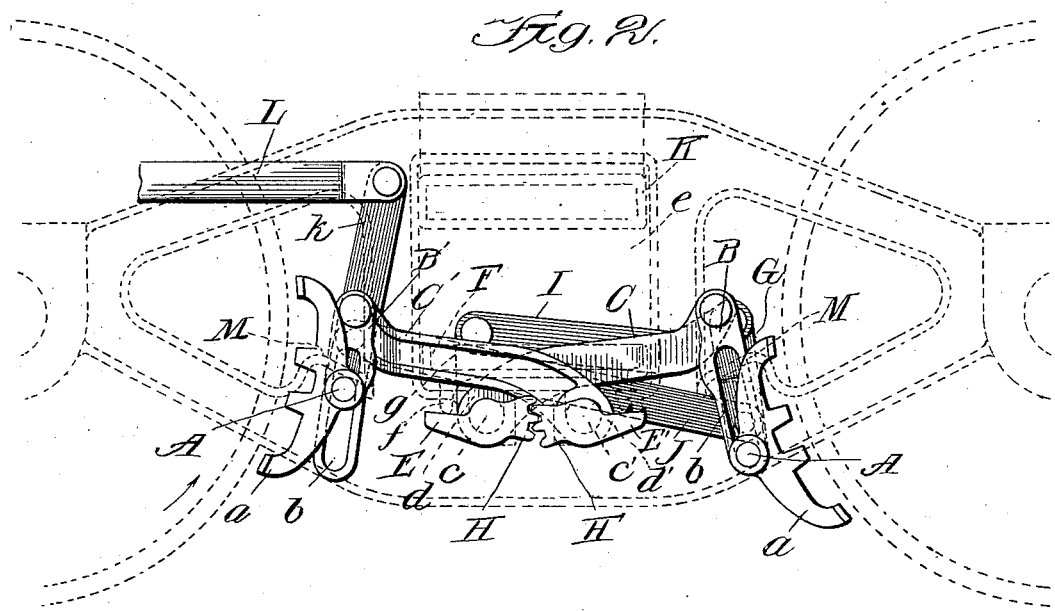
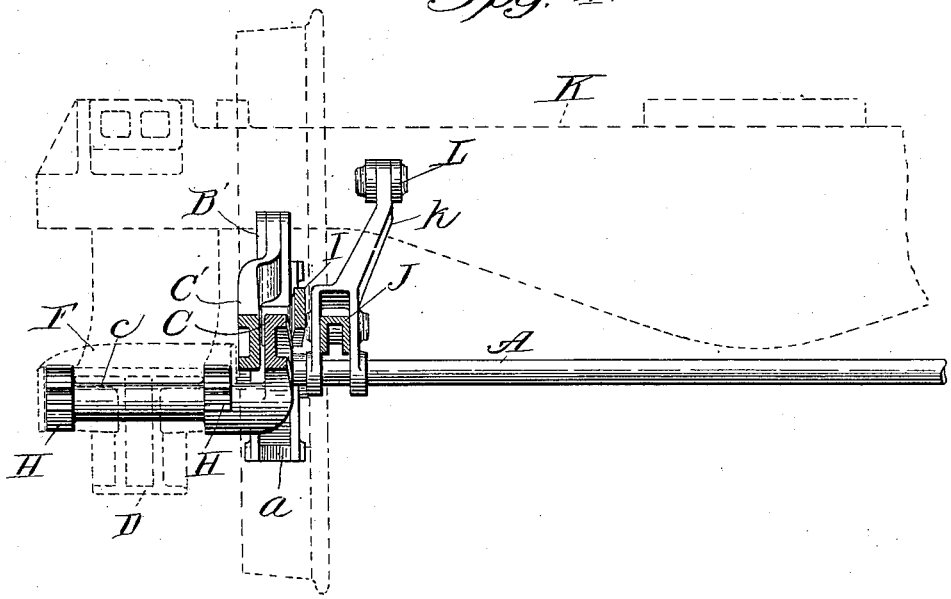

W. G. RANSOM.
BRAKE EQUALIZER.
APPLICATION FILED JUNE 12, 1909.
935,926.
Patented Oct. 5, 1909.
3 SHEETS—SHEET 3.
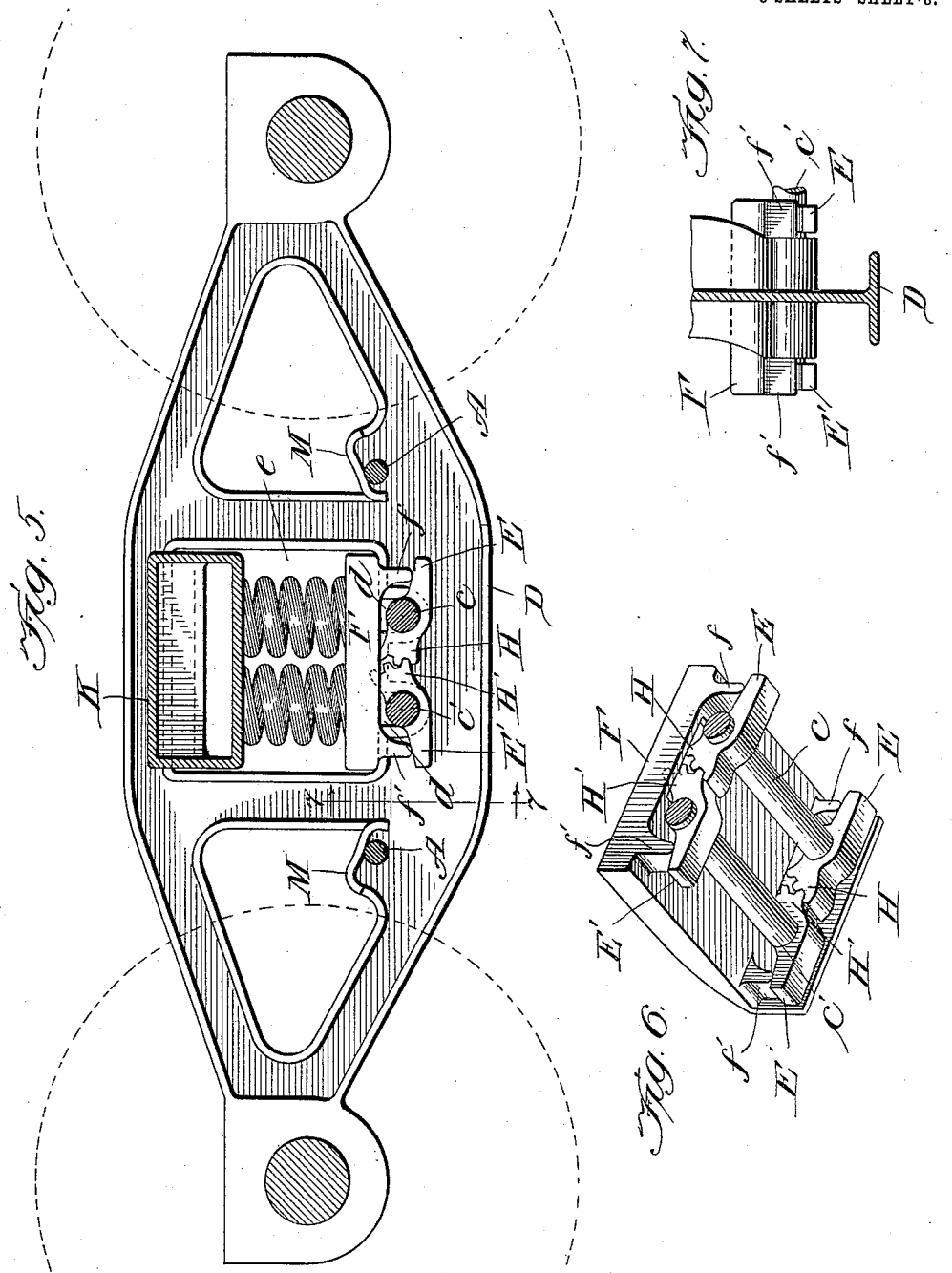
Witnesses:
E. N. Lundy.
Harry S. Gaither.
Inventor.
Willard G. Ransom
by Frank D. Thomason
Atty

UNITED STATES PATENT OFFICE.

WILLARD G. RANSOM, OF DAVENPORT, IOWA.

BRAKE-EQUALIZER.

935,926.  Specification of Letters Patent.  Patented Oct. 5, 1909.

Application filed June 12, 1909. Serial No. 501,736.

*To all whom it may concern:*

Be it known that I, WILLARD G. RANSOM, a citizen of the United States, residing at Davenport, in the county of Scott and State of Iowa, have invented new and useful Improvements in Brake-Equalizers, of which the following is a full, clear, and exact description.

Heretofore the aim of those interested in solving the problem of brake power limitation or equalization was to make the weight of the car and its load determine the maximum amount of braking pressure exerted by the brake-shoes upon the wheels. The weight is undoubtedly an important factor in determining this pressure, but is insufficient to determine the highest possible limit without danger of wheel sliding, unless the speed or momentum of the car is taken into consideration. This point is due to the fact that the retarding effort of the brake-shoe under a constant direct pressure varies greatly with change of speeds.

Realizing this fact it is the object of my invention to provide mechanism to determine this question of equal and adequate braking pressure, that will be actuated both by the weight and the speed of each car of a train with their varying weights and loads. This I accomplish by the means hereinafter fully described, and as particularly pointed out in the claims.

In the drawings:—Figure 1 is a side view of a car-truck in dotted lines showing in full lines my improved brake equalizing mechanism applied thereto with the brake-shoes disengaged from the wheels. Fig. 2 is a similar view with the brake-shoes in engagement with said wheels. Fig. 3 is a plan view of a fragmentary view of a car-truck in dotted lines showing my improvements in full lines. Fig. 4 is a transverse vertical section thereof taken on dotted lines 4, 4, Fig. 3. Fig. 5 is a view of the inner side of the side frame of the car-truck, in elevation. Fig. 6 is a perspective view of the underside of the spring platform. Fig. 7 is a transverse vertical section on line 7, 7, Fig. 5.

In the drawings A represents the brake-beams, and $a$ the brake shoe holders or heads. These brake-shoe holders have parallel vertical flanges projecting from the edges of their backs, in which bearings are made for the brake-beams to pass through, and between these bearings said brake-beams pass through longitudinally elongated openings $b$ in links B, B', by means of which said brake-beams are supported. These links correspond in length and otherwise, and their upper ends are pivotally connected to the adjacent upper ends of the arms C, C', which are shaped so that their lower ends can pass each other opposite the center of length of the side frames D of the truck, and are respectively secured to the inner ends of transverse rock-shafts or spindles, $c$, $c'$. These spindles are journaled in open bearings $d$, $d'$, in the sill of the bolster-opening $e$ of said side frames D, and, just outside their bearings, and said spindles are provided with segmental gears H, H', that project toward and engage each other. Projecting in the opposite direction to these segmental gears, from each end of each spindle $c$, $c'$, are corresponding fingers E, E', which normally, bear upward against the feet $f$, $f'$, depending down from the spring-seat F, near each corner, just alongside of the sill of the bolster opening, on which said spring seat is seated.

The inner end of spindle $c$ extends slightly farther than the corresponding end of spindle $c'$, to enable arm C to cross and pass to the rear of arm C', and also to avoid interference with an upwardly extending short arm $g$ that projects from the boss of arm C. The upper end of arm $g$ is connected by a link I, extending to the inner surface of the side frame past the vertical plane of the center of length of the bolster opening, with the upper end of an arm or lever G which latter is secured to and projects vertically from the rear brake beam, next the inner side of the brake-shoes. The lower portion of this arm G, is bifurcated, and between the legs thus made I insert and pivotally connect thereto the rear end of a connecting rod, J, which latter extends under the bolster K, toward the center of the car, and has its opposite end connected to the bifurcated lower portion of an arm or lever $h$, that is secured to and projects from the forward brake-beam at the same angle arm G does from the rear brake-beam. Lever $h$ is longer than arm G, but with proportional distances between points of force application, and the center of the pivotal connection of the connecting rod J therewith is farther from the axis of the forward brake-beam, than the center of the pivotal connection of the rear end of said rod with arm G, is from the axis of the rear brake-beam. The upper end of lever $k$ is pivotally connected to and it is moved by rod L, which latter is connected to the air brake cylinder gearing (not shown) or other source of power for operating the brakes.

The ends of the brake-beam, A, extend beyond the brake shoe holders, toward the side frames of the truck a suitable distance, and the upward movement of said brake-beams, when the car is moving in such direction that the part of the wheel engaged by the brake-shoes thereof moves upward, is limited by suitably shaped horizontally disposed flanges M, projecting from the inner side of the side frame in a plane slightly above the sill of the bolster opening.

In operating, when the air brake cylinder rod L is moved away from the center or toward the end of the car, the brake beams A and brake shoe holders are moved toward and into engagement with the wheels. This is accomplished through the medium of the lever $k$, the bar or rod J and the arm G, which latter, is connected, as hereinbefore explained, by link I to the short arm $g$ of the farthest spindle $c$. After the maximum braking pressure is exerted through these instrumentalities upon the wheel, the excess power which is expressed by the continued movement of the parts, rocks spindle $c$ and $c'$, and lifts the spring seat and the springs and bolster sustained thereby. Now if the wheels are traveling in the direction indicated by the arrows, the ends of the brake-beam nearest rod L will be held against the contiguous flange M of the side frame by the friction of the upward movement of the tread of the wheel against the brake-shoe $a$, and any rearward movement of lever B′ will make said brake shoe press the hardest against the wheel. When the brake-shoes farthest from rod L engage the rear wheels the downward movement of the treads of the latter at this point moves the brake shoe shoulders and brake-beams downward according to the speed of the car, and it will be noted in this particular that the faster the wheels revolve (due to the change in coefficient of friction due to increased speed), the less the downward pulling tendency of the circumferential friction of the wheel on the brake-shoes, and, *e converso*, the slower the revolution the greater the effort of the wheels to move the brake shoes downward. When the rear brake beams move downward they, through the medium of links B, and arms C cause the fingers E, E′, to lift the spring seat, and through the latter and springs, bolster and load carried thereby. It will, of course be appreciated, that the greater the load, the greater resistance to the lifting effort of the rod L and the downward movement of the rear brake shoes, and consequently the greater will be the braking pressure against the wheel. When the rear brake shoes move downward, a correspondingly downward movement of the forward brake-shoe is avoided by reason of the slot $b$ in link B′. When the wheels of the car, are revolving in the opposite direction to that indicated by the arrows, the forward brake beam moves downward and the rear brake beam remains stationary.

What I claim as new is:—

1. Brake equalizing mechanism for cars comprising brake-shoes and support therefor, and means for utilizing the circumferential pull of the treads of the revolving car-wheels on said shoes to lift the weight of the car and its load.

2. Brake equalizing mechanism for cars comprising brake-shoes and support therefor, and means for utilizing the circumferential downward pull of the treads of the revolving car-wheels on said shoes to lift the weight of the car and its load.

3. The combination with a car-truck comprising car-wheels, brake-shoes therefor, side-frames and bolster, of devices for utilizing the power in excess of that necessary to exert the effective maximum braking-pressure of said shoes on said wheels, to lift said bolster and its load, and means that utilize the circumferential pull of the treads of said revolving wheels on their coacting brake-shoes, and coöperate with said devices to lift said bolster.

4. The combination with a car-truck comprising car-wheels, brake-shoes therefor, side-frames, and bolster, of devices for utilizing the power in excess of that necessary to exert the effective maximum braking pressure of both the forward and rear shoes against the wheels to lift said bolster and its load, and means that utilize the downward circumferential pull of the treads of one pair of revolving wheels on their coacting brake-shoes and coöperate with said devices to lift said bolster.

5. The combination with a car-truck comprising car-wheels, side-frames, a bolster, brake-beams and brake-shoes carried thereby and adapted to engage the circumferences of said wheels nearest the bolster, of suitable means for moving the brake-shoes into engagement with said wheels, and supports for said brake-beams through the medium of which the circumferential drag or pull of one pair of said wheels on its coacting brake-shoes is utilized to assist in lifting the bolster and its load.

6. The combination with a car-truck comprising car-wheels, side-frames having a bolster opening therein, a bolster, brake-beams and brake-shoes carried thereby, and adapted to engage the circumferences of said wheels nearest said bolster, of suitable means for moving the brake-shoes into engagement with said wheels, bolster springs, a seat therefor in said bolster-opening, devices adapted to lift said seat, and supports for said brake-beams through the medium of which the circumferential drag or pull of one pair of said wheels on its coacting brake-shoes is utilized to assist in actuating said devices and lifting the said seat.

7. The combination with a car-truck comprising car-wheels, side-frames having a bolster opening therein, a bolster, brake-beams and brake-shoes carried thereby, and adapted to engage the circumferences of said wheels nearest said bolster, of suitable means for moving the brake-shoes into engagement with said wheels, bolster springs, a seat therefor in said bolster-opening, transverse rocking spindles journaled in said side-frames below the bolster opening fingers on the ends thereof engaging said seat adapted to lift said seat, and supports for said brake-beams through the medium of which the circumferential drag or pull of one pair of said wheels on its coacting brake-shoes is utilized to assist in actuating said spindles and lifting the said seat.

8. The combination with a car-truck comprising car-wheels, side-frames having a bolster opening therein, a bolster, brake-beams and brake-shoes carried thereby, and adapted to engage the circumferences of said wheels nearest said bolster, of suitable means for moving the brake-shoes into engagement with said wheels, bolster springs, a seat therefor in said bolster-opening, transverse rocking spindles journaled in said side-frames below the bolster-opening, segmental gear projecting from and connecting said spindles fingers on the ends thereof engaging said seat, adapted to lift said seat, and supports for said brake-beams through the medium of which the circumferential drag or pull of one pair of said wheels on its coacting brake-shoes is utilized to assist in actuating said spindles, and lifting the said seat.

9. The combination with a car-truck comprising car-wheels, side-frames having a bolster opening therein having open bearings in the sills thereof, a bolster, brake-beams and brake-shoes carried thereby, and adapted to engage the circumferences of said wheels nearest said bolster, of suitable means for moving the brake-shoes into engagement with said wheels, bolster springs, a seat therefor in said bolster-opening, transverse rocking spindles journaled in said side-frames below the bolster opening fingers on the ends thereof engaging said seat, adapted to lift said seat, and supports for said brake-beams through the medium of which the circumferential drag or pull of one pair of said wheels on its coacting brake shoes is utilized to assist in actuating said spindles and lifting the said seat.

10. The combination with a car truck, comprising car-wheels, a bolster, brake-beams and brake-shoes carried thereby, and side-frames engaged by and adapted to limit the upward movement of said brake-beams, of means for moving the brake-shoes into engagement with said wheels, and supports for said brake-beams through the medium of which the circumferential drag or pull of one pair of wheels upon its coacting brake-shoes is utilized to assist in lifting the bolster and its load.

11. The combination with a car-truck comprising car-wheels, side-frames having bolster-openings therein, brake-beams and brake-shoes carried thereby, of means for moving the brake-shoes into engagement with said wheels, links connecting said brake-beams to arms, suitably connected transverse spindles having bearings below said bolster openings from the ends of which said arms project, fingers projecting from said spindles and devices actuated by said fingers for lifting said bolster.

12. The combination with a car-truck comprising car-wheels, side-frames having bolster-openings therein, brake-beams and brake-shoes carried thereby having a limited upward movement, of means for moving the brake-shoes into engagement with said wheels, slotted links connecting said brake-beams to arms, suitably connected transverse spindles having bearings below said bolster openings from the ends of which said arms project, fingers projecting from said spindles and devices actuated by said fingers for lifting said bolster.

In witness whereof I have hereunto set my hand this first day of June 1909.

WILLARD G. RANSOM.

Witnesses:
A. K. READING,
C. P. HERD.